Aug. 24, 1954  L. E. CLINE ET AL  2,687,289
APPARATUS FOR HEAT-TREATING ON THERMOMETERS
Filed Aug. 26, 1952  5 Sheets-Sheet 2
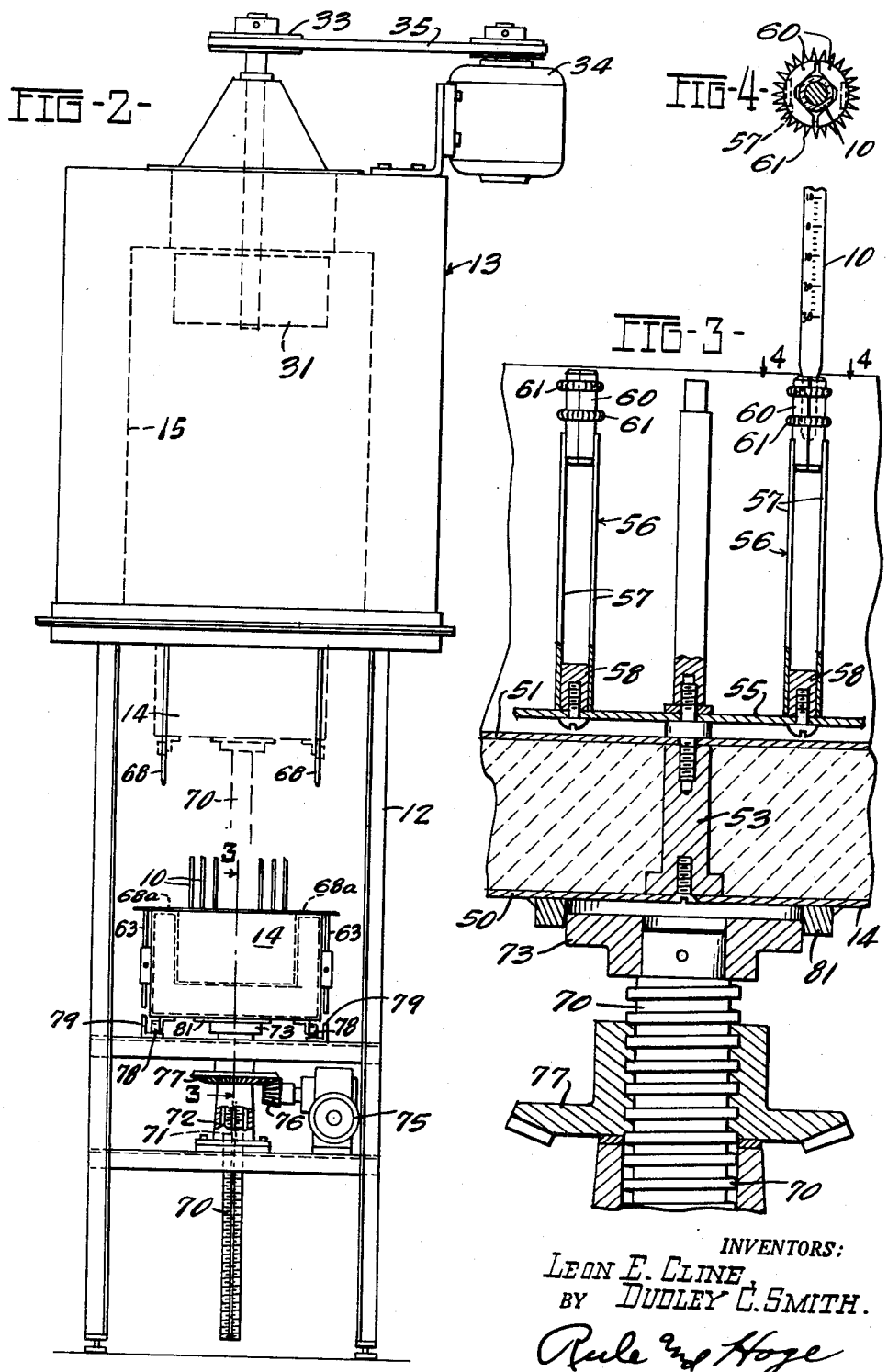
INVENTORS:
LEON E. CLINE,
BY DUDLEY C. SMITH.
ATTYS.

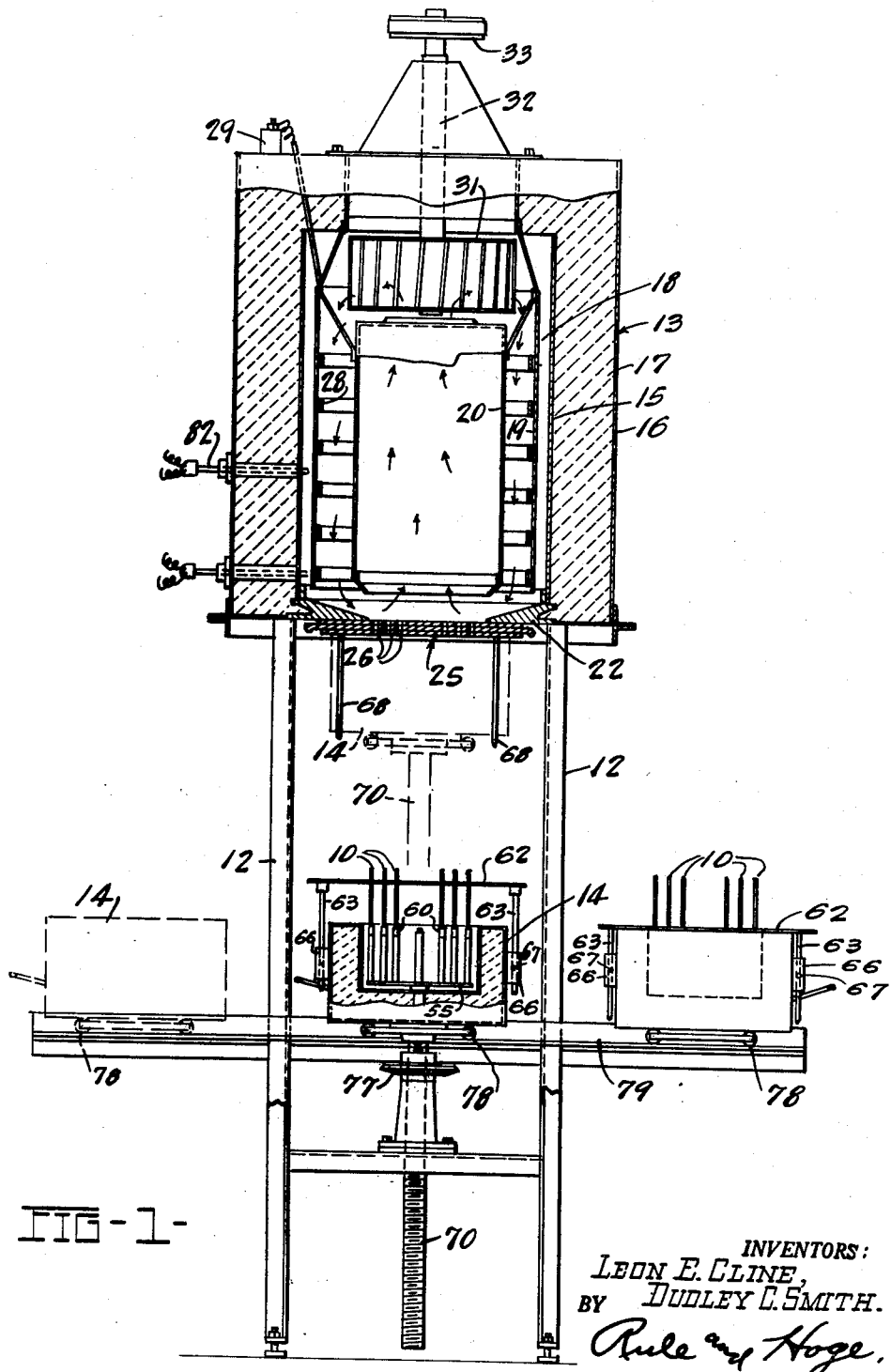
FIG-1-

Aug. 24, 1954 L. E. CLINE ET AL 2,687,289
APPARATUS FOR HEAT-TREATING ON THERMOMETERS
Filed Aug. 26, 1952 5 Sheets-Sheet 3
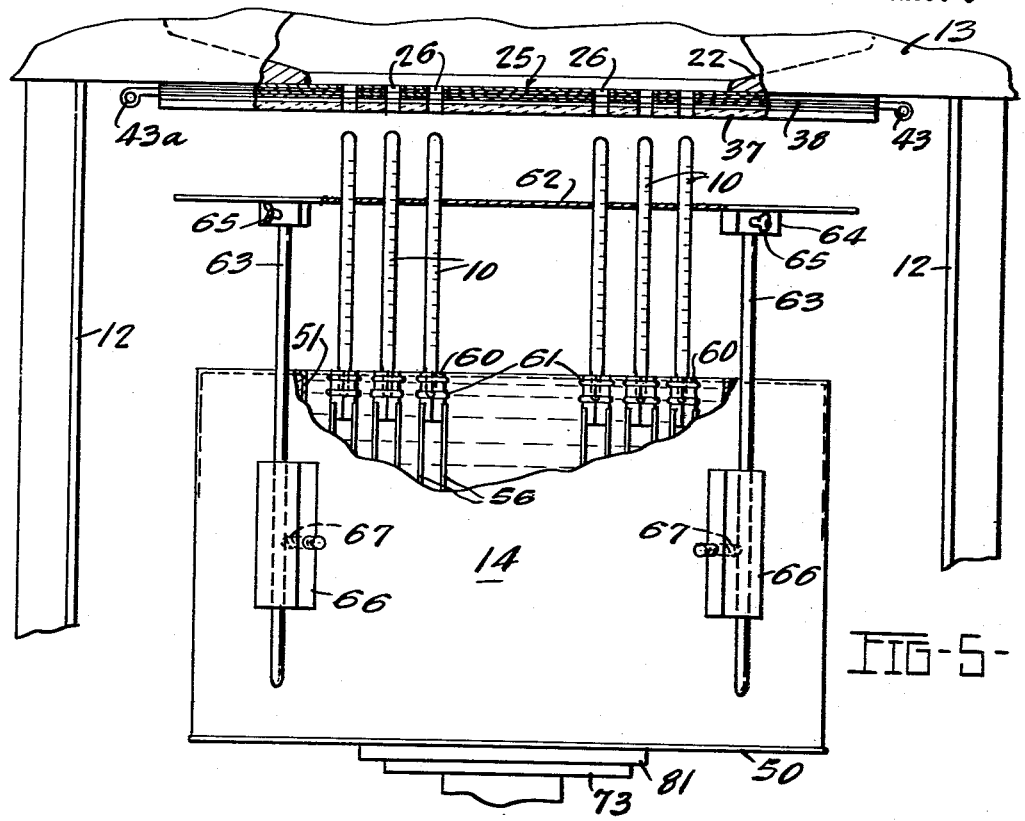
FIG-5-
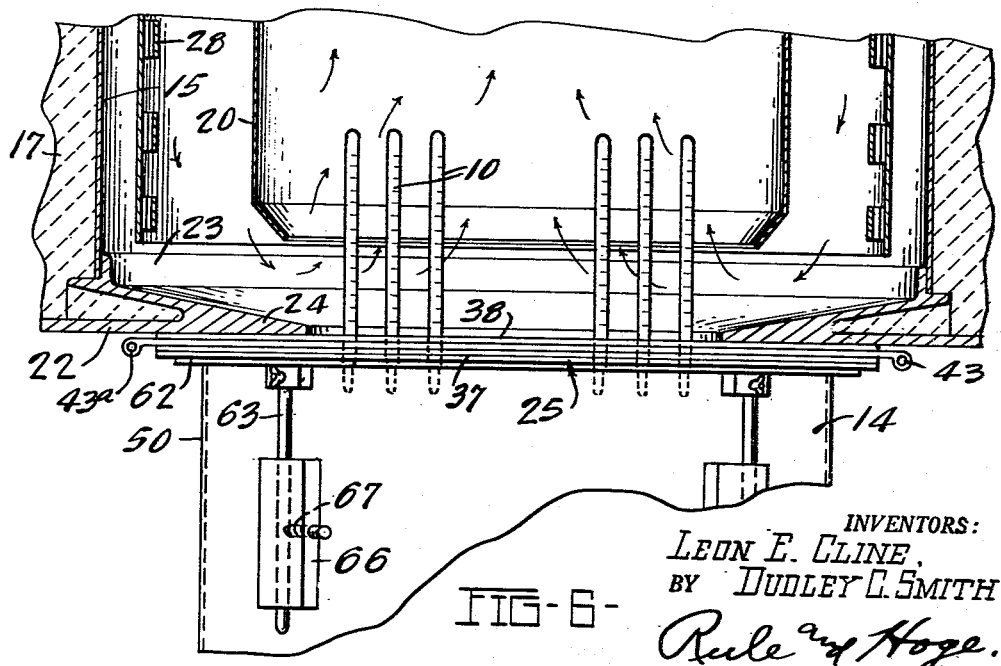
FIG-6-
INVENTORS:
LEON E. CLINE,
BY DUDLEY C. SMITH.
ATTYS.

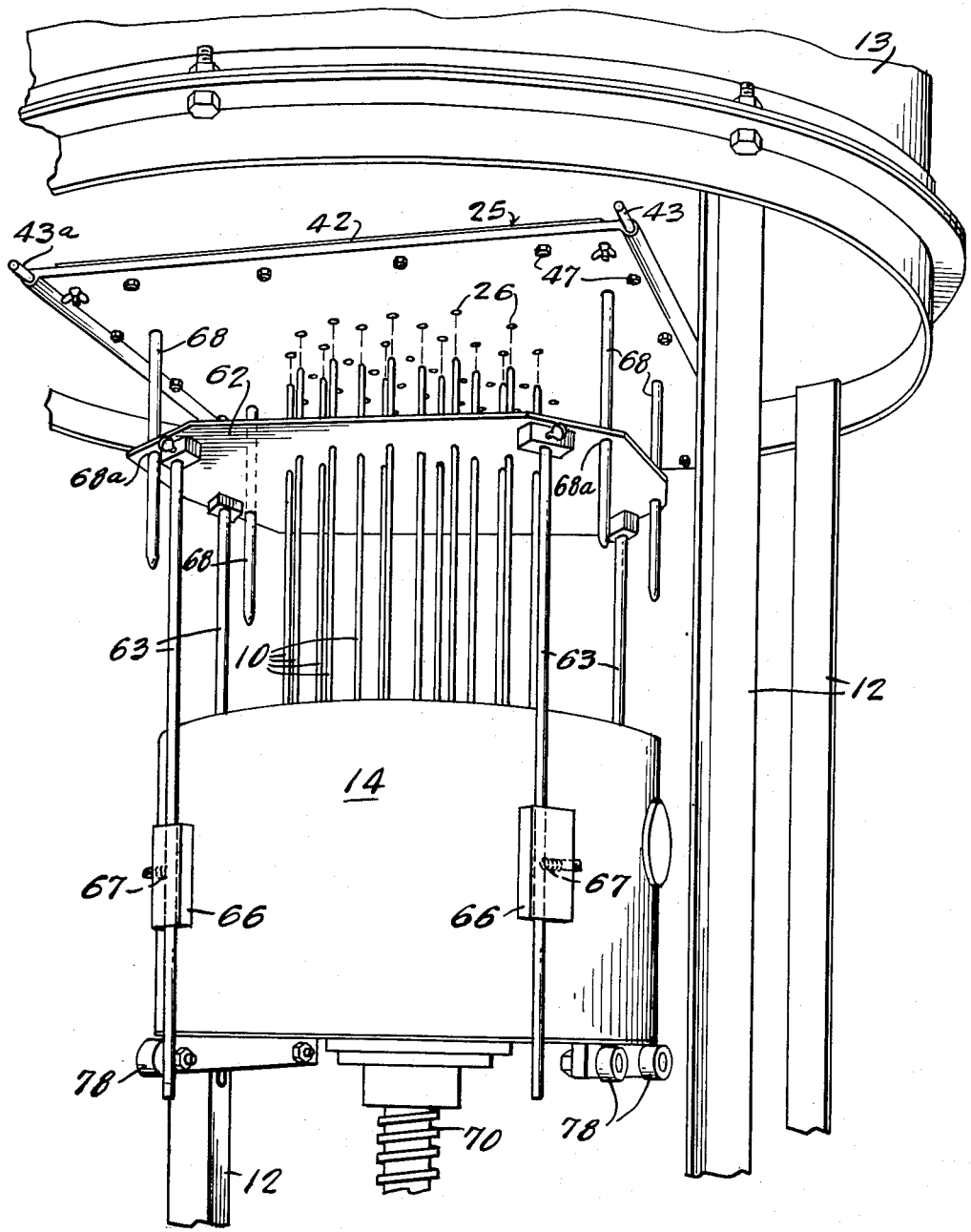

Aug. 24, 1954         L. E. CLINE ET AL         2,687,289
APPARATUS FOR HEAT-TREATING ON THERMOMETERS
Filed Aug. 26, 1952                    5 Sheets-Sheet 5
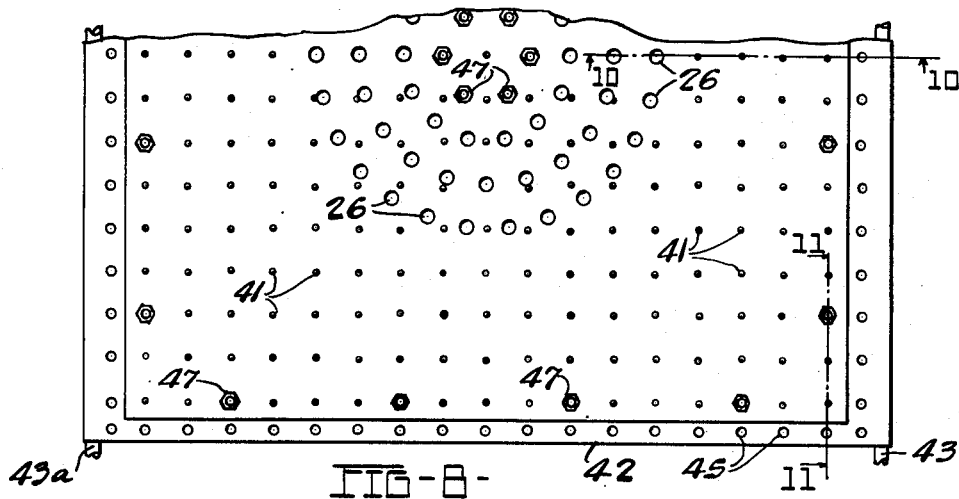
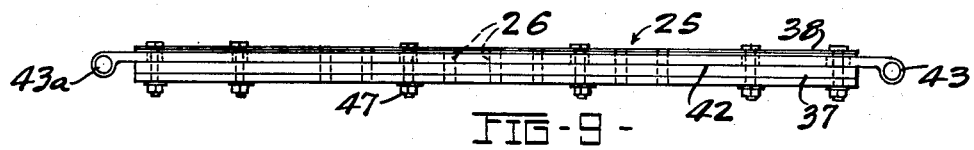
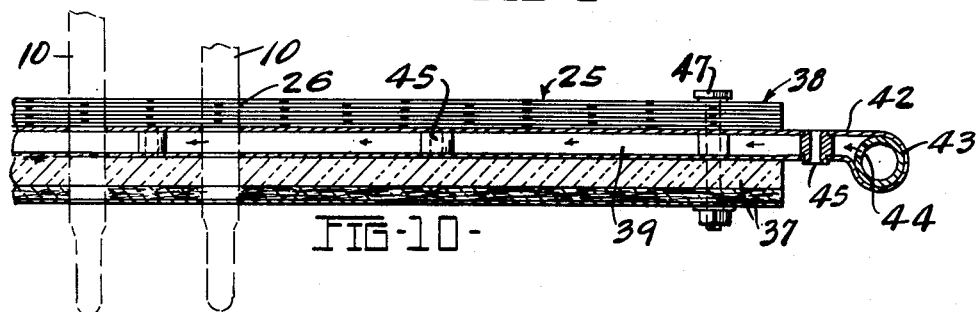
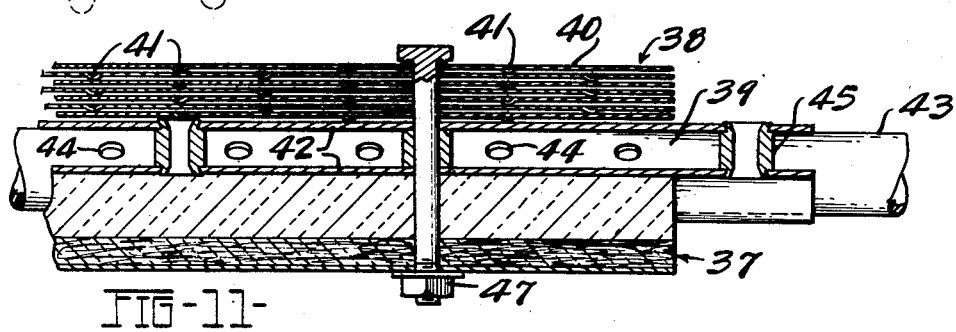
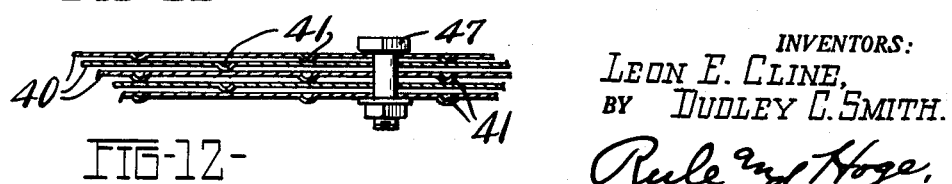
INVENTORS:
LEON E. CLINE,
BY DUDLEY C. SMITH.

Patented Aug. 24, 1954

2,687,289

UNITED STATES PATENT OFFICE 2,687,289

APPARATUS FOR HEAT-TREATING ON THERMOMETERS

Leon E. Cline and Dudley C. Smith, Vineland, N. J., assignors to Owens-Illinois Glass Company, a corporation of Ohio Application August 26, 1952, Serial No. 306,424

17 Claims. (Cl. 263—6)

Our invention relates to thermometers and particularly to apparatus for applying a permanent type of graduation markings, numerals and other indicia to thermometer stems by heating the stems to relatively high temperatures while refrigerating the bulb portion containing the mercury or other expansible thermometric fluid. One prior art method of applying the scale markings consists in etching the markings in the surface of the glass tube in a well known manner, filling the markings or depressions thus formed with a marking material in the form of a paste and thereafter subjecting the same to a high temperature by which such marking material is reacted and integrated with or permanently attached to the glass. In practicing such method it is necessary to maintain the thermometer bulb containing the mercury or other thermometric material at a sufficiently low temperature to retain such material within the bulb as any expansion into the stem while the latter is at a high temperature would injure or ruin the thermometer.

Reference may be had to the patent to Greene 2,220,096, November 5, 1940, for a disclosure of this general method. The apparatus herein disclosed is designed for overcoming practical difficulties which have been encountered in practicing such method of high temperature treatment.

In some thermometers the graduations or other indicia are spaced only a short distance above the bulb, and owing to the large temperature differential between the refrigerated bulb and the portion of the stem under heat treatment, difficulty has been experienced providing suitable insulation to maintain the proper temperatures and maintain a uniformly high temperature to the portion of the stem under treatment.

The present invention provides an improved apparatus for overcoming this difficulty. The invention further provides improved apparatus for treating a large number of thermometers at the same time, novel means permitting the thermometers to be rapidly placed within the refrigerating bath, and novel power operated means for lifting the bath from a position in which it is spaced below the furnace and introducing the stems into the heat treating compartment of the furnace, and means for properly aligning the bath with the furnace and guiding and protecting the thermometer stems while being moved into and out of the furnace.

Basically the apparatus provides an air circulating furnace, a refrigerating bath therebeneath with means for holding the thermometers with the bulbs immersed in the refrigerating bath, and a motorized jack screw mechanism for raising and lowering the bath and thereby moving the thermometers into and out of the furnace. A laminated or multiple layered shield which provides a bottom wall for the furnace is interposed between the furnace and the refrigerating bath therebeneath and is used for insulating purposes. As more fully pointed out hereinafter this shield assists in maintaining a highly uniform temperature throughout the length of the graduated stem during the heat treating.

The thermometer stems are inserted into the furnace through holes in the insulating shield by lifting the refrigerating bath while the thermometers are held by chucks carried in the refrigerating bath.

Referring to the accompanying drawings.

Fig. 1 is a part sectional front elevational view of an apparatus embodying our invention;

Fig. 2 is a side elevation of the same;

Fig. 3 is a fragmentary part sectional elevation at the line 3—3 on Fig. 2 and on a larger scale, showing a portion of the lifting jack, the refrigerating tank or bath, and chucks for holding the thermometers therein;

Fig. 4 is a cross sectional view of a chuck at the line 4—4 on Fig. 3;

Fig. 5 is a part sectional elevation showing the refrigerating bath in an intermediate position, the guide plate for the thermometer stems and the insulating shield at the bottom of the furnace;

Fig. 6 is a fragmentary sectional elevation of the furnace and the bath in its upper position;

Fig. 7 is a perspective view showing the refrigerating tank and the furnace thereover, the tank being elevated to an intermediate position;

Fig. 8 is a fragmentary plan view of the insulating shield;

Fig. 9 is a front elevation of the same;

Fig. 10 is a sectional view on a larger scale at the line 10—10 on Fig. 8;

Fig. 11 is a section at the line 11—11 on Fig. 8; and

Fig. 12 is a fragmentary view of a modified form of insulating shield.

Referring to Figs. 1 and 2, a frame structure 12 supports a hot air furnace 13 in an elevated position spaced above a refrigerator bath or tank 14 in vertical alignment with the furnace. The side walls of the furnace comprise inner and outer cylindrical shells 15 and 16 respectively, spaced to provide an insulating compartment filled with glass wool 17 or other insulating material. Within the furnace chamber 18 is a cylindrical shell 19 spaced inwardly from the wall 15 and an innermost shell 20 in the form of a cylinder.

The floor of the furnace is formed in part by a ring shaped plate or casting 22 formed with a flange 23 (Fig. 6) which fits within the shell 15. The upper surface 24 of the plate 22 slopes downwardly and inwardly and is spaced below the shell 20 to provide space for the circulating air. Beneath the bottom plate 22 is the heat shield 25 which completes the bottom wall or floor of the furnace and is provided with a multiplicity of holes 26 through which the thermometers 10 are protruded into the furnace when the refrigerating bath is elevated as hereinafter described.

The furnace may be electrically heated. For this purpose electrical resistances or heating elements 28 are provided. These are in the form of rings attached to the inner wall surface of the shell 19 and connected to binding posts 29. Electric current is supplied from any suitable source.

Air is circulated through the furnace by means of a fan 31 attached to a vertical driving shaft 32 on which is a pulley 33 driven by an electric motor 34 through intermediate gearing including a belt 35. The operation of the fan causes circulation of air as indicated by the arrows in Fig. 1. The air moves downwardly between the shells 19 and 20 passing over and in contact with the heat shield 25 and thence upwardly to the fan, the circulation being in a closed path.

By referring to Fig. 6 it will be seen that when the refrigerating bath 14 is in its lifted position, it is directly in contact with the heat shield 25 so that the graduated portions of the thermometer stems are within the furnace while the bulbs or lower end portions which form a reservoir for the mercury or other thermometric material are maintained within the refrigerating bath with only the shield 25 between the bulbs and the scale markings. While the bath 14 is in its lifted position the shield serves by its insulating properties as a means for maintaining a highly uniform temperature of the air in which the thermometer stems are enveloped during the heat treatment. That is to say, the heat shield prevents heat exchange from the furnace to the refrigerating bath in any appreciable amount. At the same time the heat shield serves as a means to insulate the furnace from the refrigerating bath and thereby prevents heat loss from the furnace.

Owing to the comparatively short distance between the bulbs and the markings on the thermometer stems, the heat shield must be comparatively thin to permit the uniform heating of all of the scale graduations.

The construction of the heat shield 25 as shown in Figs. 8 to 11 is as follows:

The shield is of rectangular form and comprises a lower section of insulating material 37, an upper section 38, and an intermediate section 39 comprising a shallow chamber providing an air space between the upper and lower sections. The upper section 38 is of laminated construction comprising a plurality of superimposed sheets 40 of metal or other suitable material, each sheet being formed with a multiplicity of indentations or bosses 41 by which the sheets are narrowly spaced apart. The intermediate section 39 comprises vertically spaced horizontal rectangular sheets 42 which extend laterally beyond the margin of the laminated sheets 40. The end portions of the sheets 42 are wrapped around pipes 43 and 43a which extend along the margins of the heat shield. The chamber 39 may serve as a dead air space or if desired, air may be circulated therethrough. If circulation of air is desired, the pipes 43 and 43a are provided with lateral openings 44 at intervals therealong for distributing the air which is pumped into the inlet pipe 43. The plates 42 forming the upper and lower walls of the air chamber 39 are held rigid and in spaced relation by spacing means such as studs 45. The several sections of the heat shield 25 are held in assembled relation by bolts 47.

Although the heat shield 25 as above described is a composite structure including in addition to the laminated sheets 40, the air chamber 39 and the insulating material 37 which may comprise a layer of asbestos and a layer of hair felt or the like, highly satisfactory results have been obtained by the use of laminated sheet material formed of the sheets 40, as shown in Fig. 12, which may be considered the preferred form of heat shield. The sheets 40 may be very thin parallel sheets of stainless steel with the bosses 41 spaced at sufficiently short distances apart to give great rigidity to the heat shield as well as maintaining the proper shallow spacing of the sheets. With the construction as shown in Fig. 11, we have found it practical to make the entire heat shield of a thickness not more than ½ or ⅝ of an inch. By the use of the laminated sheets 40 alone, as in Fig. 12, this thickness can be materially reduced.

The refrigerating bath or tank 14 comprises an outer shell 50 and an inner shell 51 of sheet material spaced apart to provide an insulating compartment filled with glass wool, rock wool or other insulating material. The refrigerant may consist of alcohol and Dry Ice or other materials. As shown in Fig. 3 the post 53 reinforces the shells 50 and 51 and also provides a support for a horizontal plate 55 within the refrigerating tank and spaced a short distance above the floor of the tank. The plate 55 forms a supporting base on which a battery of thermometer holders 56 are mounted. Each holder includes a pair of vertical leaf springs 57 (Figs. 3 and 4) attached to the plate 55 by plugs 58 and screws 59. The leaf springs at their upper ends carry a pair of gripping jaws 60 forming a holding chuck for a thermometer. Surrounding the gripping jaws are spring gripping means 61 in the form of coil springs, rubber bands or other elastic material for holding the jaws in engagement with the thermometer bulbs. The leaf springs 57 provide a yielding support for the thermometer, permitting it to move bodily in lateral directions and thereby reducing or eliminating the possibility of breakage during the assembling or removal of the thermometers and also protecting them during their movement into and out of the heating furnace.

A guide plate 62 is carried by the refrigerating tank 14 for guiding the thermometers and holding them in accurate alignment with the openings 26 in the insulating shield as the thermometers are moved upwardly into the furnace. The plate 62 may consist of sheet brass or other material. Guide plate rods 63 are removably attached to the plate 62 by means of bearing blocks 64 secured to the underside of the plate 62 and thumb screws 65. The guide rods 63 extend vertically downward through bores in vertically elongated bearing blocks 66 rigidly secured to the side walls of the tank 14. The guide rods have a frictional sliding engagement with the blocks 66. Coil springs 67 mounted in the blocks 66 and bearing against the rods 63 frictionally hold the guide plate 62 at any desired height above the refrigerating bath.

Referring to Fig. 7, aligning pins 68 are rigidly attached to and depend vertically from the shield 25 and enter and extend through openings in the guide plate 62 as the latter is moved upward. The pins 68 serve as aligning and guiding pins or rods for aligning the plate 62 to bring the openings therein into register with the openings 26 in the shield 25 and maintaining such alignment during the vertical movement of the refrigerating tank, the guide plate 62 being slidable on the rods 68 during such movement.

The refrigerating tank 14 is lifted and lowered by a power operated lifting jack which comprises a jack screw or screw threaded rod 70 (Figs. 2 and 3) mounted in the frame 12 for vertical movement and held against rotating movement by means of a spline 71 within a standard 72 through which the screw rod extends. Keyed to the upper end of the rod 70 is a rectangular plate 73 which provides a support for the bath 14. The screw rod 70 is rotated by an electric motor 75 (Fig. 2) which has operating connections with the screw through a train of gears including a miter pinion 76 and gear 77, the latter having a screw threaded connection with the rod 70. The refrigerating tank is provided with wheels 78 (Figs. 1 and 2) to run on tracks 79 which permit the tank to be moved horizontally into and out of position over the lifting jack. As the tank is moved into position the bath supporting plate 73 moves into position between a pair of guides 81 which may form the parallel sides of a U-shaped rod fixed to the lower surface of the tank so as to engage three sides of the plate 73 thereby holding the tank against rotative movement and in proper register with the furnace floor. As shown in Fig. 1, a plurality of tanks 14 is provided permitting each tank with its batch of heat treated thermometers to be lowered and moved to one side on the tracks and the other loaded tank to be moved from the other side into heat treating position. Each tank may be unloaded and again loaded with thermometers while a batch of thermometers carried by the other tank is being heat treated.

The firing temperature within the furnace 13 is automatically regulated and controlled by thermostatic means electrically connected to thermocouples 82 (Fig. 1). The temperature employed and the length of firing time are variable and deepnd upon the marking materials employed and the kind of glass to which they are applied. The present invention is adapted for use in applying various marking materials as for example, ceramic coatings, frits or enamels such as disclosed in the above identified patent to Greene. However, more satisfactory materials for such markings comprise various metallic salts which when applied to the thermometers and subjected to suitable high temperatures, provide a permanent coloring or stain which penetrates the surface of the glass and forms a part thereof and is resistant to wear, abrasion, high temperatures, acids, and is permanent under all ordinary conditions which may be met with in use. Such staining materials may be applied in the form of a paste comprising a mixture of oxides or salts of copper, iron, chromium, silver or other metals, with fillers, solvents and the like. The staining materials employed form no part of the present invention.

The temperature in the firing oven must be maintained below that at which softening and deformation of the glass would occur. For example, the firing temperature where lead glass and a metallic salt are employed, may be within the range of 343° C. to 455° C. and the firing period from 10 to 15 minutes. With borosilicate glass, the required temperature is higher and may be within the range of 427° to 593° C., and the firing time from 7 to 13 minutes. With ceramic enamels the temperatures may be in excess of 525° C.

In operation the guide plate 62 is moved downwardly to or into close proximity to the refrigerating bath 14. The operator then places the thermometers in the chucks 60, each thermometer being moved downwardly through an opening in the plate 62. After the battery of thermometers has been thus placed in the refrigerating bath, the guide plate 62 is moved upwardly by hand to a position spaced above the bath (Fig. 7). This upward movement of the guide plate 62 serves to adjust and hold all the thermometers vertical. The motor 75 (Fig. 2) is now started and operates the lifting jack causing the supporting plate 73 to engage the bottom of the tank and move the tank upwardly. During this upward movement the tapered ends of the aligning pins 68 pass through the openings 68ª in the guide plate 62 so that the guide plate is adjusted by said pins to accurately align the thermometers with the openings 26. As the tank continues its upward movement, the guide plate 62 is brought into engagement with the insulating shield 25 and the tank as it continues its upward movement is guided by the now stationary guide rods 63. After the heat treating operation, the motor 75 is reversed and moves the refrigerating tank downwardly.

If the thermometer bulbs are of larger diameter than the stems the mode of loading and unloading the thermometers will be slightly different. In this instance the thermometers will be placed in the chucks 60 before the guide plate 62 is placed in position by moving it downwardly over the thermometers.

Modifications may be resorted to within the spirit and scope of our invention.

We claim:

1. Apparatus for heat treating indicia material applied to thermometers, said apparatus comprising a furnace, means containing a refrigerating bath positioned beneath the furnace, means for supporting thermometers in upright position with the bulb portions within said bath, an insulating shield forming a floor portion of the furnace and having openings therethrough in vertical alignment with said thermometers, the said bath being movable upwardly relative to the furnace into position to project the thermometer stems through said openings into the furnace, said insulating shield being of laminated construction comprising a multiplicity of thin superimposed sheets narrowly spaced apart and providing a multiplicity of thin open spaces alternating with and substantially coextensive laterally with the said sheets.

2. The combination set forth in claim 1, each of said sheets being formed with indentations or bosses distributed over the area of the sheet and providing a spacing means between said sheet and the next adjoining sheet.

3. The combination set forth in claim 2, said sheets consisting of metal and the spacing between each two juxtaposed sheets being of the order of one-hundredth of an inch.

4. Apparatus for heat treating indicia material applied to thermometers, said apparatus comprising a furnace, means containing a refrigerating bath mounted for vertical movement beneath the furnace, a multiplicity of thermometer holding devices mounted in said bath and attached to the floor of the bath and holding the thermometers in upright position with the bulb portions thereof immersed in a refrigerating fluid within the bath, an insulating shield forming a floor portion of the furnace and formed with openings therethrough in vertical register with the respective thermometer holding devices, and means for moving said bath vertically into position to project the thermometer stems through said openings and into the furnace.

5. The combination set forth in claim 4, each of said holding devices comprising a chuck including a pair of gripping jaws to grip a thermometer bulb and spring means to yieldingly hold the jaws in gripping position.

6. The combination set forth in claim 5, each said holding device comprising means for rigidly securing it adjacent to the floor of the bath, leaf springs extending upwardly from said securing means, the said gripping jaws being attached to the upper ends of said leaf springs.

7. Apparatus for heat treating indicia material applied to thermometers, said apparatus comprising means containing a bath having a horizontal floor and upright side walls providing a chamber for a refrigerant, a sheet metal plate mounted within said chamber and spaced a short distance above the floor of the chamber and parallel therewith, a multiplicity of upright holders within said chamber, means for attaching the lower ends of each holder to said plate, said holders comprising chucks at the upper ends thereof, each chuck including a pair of laterally expansible gripping jaws formed to receive a thermometer bulb, and spring means for holding said jaws in gripping engagement with said bulb, said holders comprising flexible material permitting lateral movement of the chucks.

8. The combination set forth in claim 7, said holders comprising vertical leaf springs to which the jaws of the chuck are attached.

9. Apparatus for treating permanent type indicia material applied to thermometers, said apparatus including a furnace, an insulating shield forming a floor portion of the furnace, means containing a refrigerating bath directly beneath said shield and mounted for vertical up and down movement, holders carried by the bath for holding thermometers in upright position with the bulbs thereon immersed in a refrigerant within the bath, a horizontally disposed guide plate, means for mounting said plate over the bath for up and down movement with and relative thereto, said plate being formed with openings therethrough in vertical register with the thermometers in said holders and through which the thermometer tubes extend, said shield having openings in register with the openings in the guide plate and into and through which the thermometers are protruded during their upward movement with the said bath, said shield forming a stop in position to arrest the upward movement of the guide plate when the bath has reached an intermediate position with the thermometers protruding through the openings in said shield.

10. The apparatus defined in claim 9, the means for mounting said guide plate comprising vertical guide rods attached to and depending from said plate, bearing blocks on said bath and through which said rods extend and in which the rods are frictionally held.

11. The combination of a furnace, an insulating shield forming a floor portion of the furnace, a refrigerating tank beneath the furnace and mounted for up and down movement, holders mounted therein for up and down movement with the tank and including chucks for gripping the bulb ends of thermometers and holding the thermometers in upright position, a guide plate mounted over and carried by said tank and adjustable up and down relative thereto, means for frictionally holding said plate in its position of adjustment relative to the tank and thereby carrying the plate upwardly with the tank as the latter is moved upward, said plate having openings in register with the thermometer holders and through which the thermometer stems extend, said insulating shield having openings in vertical register with the openings in the guide plate and through which the thermometer stems are movable into the furnace when the tank is moved upward.

12. The combination set forth in claim 11, the means for mounting the guide plate comprising guide rods attached to and depending from the guide plate, bearings on the refrigerating bath through which the rods extend, means for frictionally holding the rods in said bearings and causing the guide plate to move with the tank, said guide plate when spaced above the tank being movable upwardly therewith into engagement with said insulating shield as the tank reaches an intermediate position, the tank being then movable to its uppermost position in which the thermometer bulbs are in close proximity to said guide plate and the thermometer stems are within the furnace.

13. The apparatus set forth in claim 12 and in combination therewith, aligning pins fixed to and depending from the insulating shield, said guide plate having openings in register with the aligning pins and through which said pins are protruded by the upward movement of the guide plate with the tank and by which the guide plate openings through which the thermometers extend are maintained in accurate alignment with the openings in said insulating shield.

14. Apparatus for heat treating thermometers, comprising a furnace having a horizontally disposed floor portion formed with openings therethrough, a battery of thermometer holders mounted beneath the furnace and comprising chucks for gripping the bulb ends of the thermometers and holding the thermometers in upright position, a guide plate interposed between the furnace and said holders and formed with openings in register with the openings in said furnace floor, means for mounting the guide plate for up and down movement with and relative to the said holders, and means for moving the battery of holders upwardly into position in which the thermometer stems extend through the openings in the guide plate and furnace floor into the furnace.

15. The combination of a furnace, means for holding a battery of thermometers, an insulating shield interposed between said holding means and the furnace, said shield comprising a laminated structure including a multiplicity of thin sheets in superimposed relation, means for narrowly spacing the sheets and thereby providing a multiplicity of thin sheet-like open spaces substantially coextensive laterally with the said sheets, said shield having openings through which the thermometers in the holders extend into the furnace, and means on the opposite side of said shield from the furnace for refrigerating the bulb portions of the thermometers.

16. The combination defined in claim 15, said sheets consisting of stainless steel and being formed with bosses distributed thereover for maintaining said spacing of the sheets and giving rigidity to the shield.

17. Apparatus for heat treating thermometers comprising a furnace, means for mounting the furnace, a refrigerating tank, tracks on which the tank is mounted for horizontal movement into a position directly beneath and spaced below the furnace, holders carried by the tank and comprising means for gripping the bulb ends of the thermometers and holding the thermometers in upright position, the furnace comprising a floor with openings therethrough in vertical alignment with the said holders and the thermometers carried thereby, means comprising an electric motor and power transmission mechanism between the motor and the tank for lifting the tank and thereby projecting the thermometer stems through said openings into the furnace, said transmission mechanism including a jack screw mounted beneath the tracks in vertical alignment with the furnace, and gearing between the motor and jack screw for operating the latter.

References Cited in the file of this patent

UNITED STATES PATENTS

| Number | Name | Date |
|---|---|---|
| 2,019,599 | Driggs | Nov. 5, 1935 |
| 2,220,096 | Greene | Nov. 5, 1940 |
| 2,264,496 | Wollentin et al. | Dec. 2, 1945 |
| 2,455,085 | Oughton et al. | Nov. 30, 1948 |
| 2,456,469 | Thomas et al. | Dec. 14, 1948 |
| 2,589,390 | Hurt | Mar. 18, 1952 |
| 2,610,445 | Liberatore | Sept. 16, 1952 |

OTHER REFERENCES

Pages 286 and 287 of Trinks' Industrial Furnaces, vol. II, 2nd ed. Copyright 1942, published by John Wiley and Sons, New York, N. Y.

Pages 76 and 77 of Kern's "Industrial Heat Transfer," 1950, published by McGraw-Hill Book Co., New York, N. Y.